US012604861B2

(12) United States Patent
Dix

(10) Patent No.: US 12,604,861 B2
(45) **Date of Patent: \*Apr. 21, 2026**

(54) PET VESTIBULE

(71) Applicant: Christopher James Dix, Eureka, MO (US)

(72) Inventor: Christopher James Dix, Eureka, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/913,588

(22) Filed: Oct. 11, 2024

(65) Prior Publication Data

US 2025/0031663 A1     Jan. 30, 2025

Related U.S. Application Data

(60) Continuation of application No. 17/959,233, filed on Oct. 3, 2022, now Pat. No. 12,219,923, which is a continuation of application No. 17/724,193, filed on Apr. 19, 2022, now Pat. No. 11,457,607, which is a continuation-in-part of application No. 16/884,595, filed on May 27, 2020, now abandoned, which is a division of application No. 15/350,857, filed on Nov. 14, 2016, now Pat. No. 10,709,106.

(60) Provisional application No. 62/273,714, filed on Dec. 31, 2015.

(51) Int. Cl.
*A01K 1/035* (2006.01)
*E06B 7/32* (2006.01)
*E06B 7/34* (2006.01)

(52) U.S. Cl.
CPC .............. *A01K 1/035* (2013.01); *E06B 7/32* (2013.01); *E06B 7/34* (2013.01)

(58) Field of Classification Search
CPC .............. A01K 1/035; E06B 7/32; E06B 7/34
USPC ........................................... 119/484
See application file for complete search history.

(56) References Cited

U.S. PATENT DOCUMENTS

| | | | |
|---|---|---|---|
| 2,980,058 A | 4/1961 | Hoffman |
| 3,058,446 A | 10/1962 | Long |
| 3,587,528 A | 6/1971 | Lake |
| 4,021,975 A | 5/1977 | Calkins |
| 4,224,899 A | 9/1980 | Cruchelow |
| 4,291,645 A | 9/1981 | Cruchelow |

(Continued)

FOREIGN PATENT DOCUMENTS

| | | |
|---|---|---|
| EP | 750840 A | 1/1997 |
| FR | 2525859 A1 | 11/1983 |
| GB | 2397482 A | 7/2004 |

OTHER PUBLICATIONS

Hale Pet Door-Slant Roof Security Barrier, www.halepetdoor.com/products/59-slant-roof-security-barrier, published Nov. 2014.

*Primary Examiner* — Zoe Tam Tran
(74) *Attorney, Agent, or Firm* — Lewis Rice LLC

(57) ABSTRACT

A pet vestibule configured for being attached to a door and to either swing open with the door or to be removably installed so the vestibule can be released from the interior side of the door before the door is opened, and the door can swing freely. The vestibule can then be rolled out of the doorway. The vestibule provides a protected shelter area for pets and animals to come and go into a structure without the need for human assistance, while also inhibiting rain, snow, and other inclement weather from entering the structure through the pet door.

20 Claims, 10 Drawing Sheets

(56) References Cited

U.S. PATENT DOCUMENTS

| | | | | |
|---|---|---|---|---|
| 4,445,459 | A | * 5/1984 | Julie | A01K 1/0236 119/28.5 |
| 4,760,872 | A | 8/1988 | Hale, Jr. | |
| 4,788,934 | A | 12/1988 | Fetter | |
| 4,793,286 | A | * 12/1988 | Buxton | A01K 1/033 119/498 |
| 5,134,973 | A | 8/1992 | Sarullo | |
| 5,148,767 | A | 9/1992 | Torchio | |
| 5,165,366 | A | 11/1992 | Harvey | |
| 5,649,500 | A | 7/1997 | Klavemann | |
| 5,657,592 | A | 8/1997 | Davlantes | |
| 5,797,350 | A | * 8/1998 | Smith | A01K 1/035 119/475 |
| 5,970,914 | A | 10/1999 | Steil | |
| 5,975,017 | A | 11/1999 | Cameron | |
| 6,029,609 | A | 2/2000 | Bahar | |
| 6,234,116 | B1 | 5/2001 | Havener | |
| 6,394,035 | B1 | 5/2002 | Hill | |
| 6,668,487 | B2 | 12/2003 | Vesey | |
| 6,722,083 | B2 | 4/2004 | Herrmann | |
| 6,722,315 | B2 | 4/2004 | Sinor | |
| 6,912,974 | B2 | 7/2005 | Ozeri | |
| 7,178,482 | B1 | 2/2007 | Derrick | |
| 7,484,286 | B2 | 2/2009 | Fowler | |
| 7,530,331 | B1 | 5/2009 | Malachowski | |
| 7,640,890 | B1 | 1/2010 | Maynard | |
| 7,784,430 | B1 | 8/2010 | Thorne | |
| 8,484,896 | B1 | 7/2013 | Skubiak, Jr. | |
| 9,339,006 | B1 | 5/2016 | Eby | |
| 9,961,875 | B2 | 5/2018 | Goddard Imel | |
| 10,435,942 | B1 | * 10/2019 | Dunavin | E06B 7/32 |
| 2003/0094143 | A1 | * 5/2003 | Anderson | A01K 1/035 119/651 |
| 2007/0062651 | A1 | 3/2007 | Lippard | |
| 2007/0157889 | A1 | 7/2007 | Mc Donough | |
| 2007/0186866 | A1 | 8/2007 | Shibles | |
| 2008/0168716 | A1 | 7/2008 | Groh | |
| 2010/0175631 | A1 | 7/2010 | Bennatt | |
| 2011/0146583 | A1 | 6/2011 | Larson | |
| 2011/0226189 | A1 | 9/2011 | Dani Piliero | |
| 2011/0239380 | A1 | * 10/2011 | Grass | A01K 13/001 14/71.1 |
| 2012/0073201 | A1 | 3/2012 | Duffany | |
| 2012/0186534 | A1 | * 7/2012 | Lu | A01K 1/035 119/706 |
| 2012/0318206 | A1 | 12/2012 | Van Leeuwen | |
| 2013/0263790 | A1 | 10/2013 | Stange | |
| 2014/0230746 | A1 | 8/2014 | Chapman | |
| 2014/0238891 | A1 | * 8/2014 | Tagliamonte | A01K 1/035 206/581 |
| 2014/0305378 | A1 | 10/2014 | Lever | |
| 2015/0216139 | A1 | 8/2015 | Drake | |
| 2017/0006821 | A1 | 1/2017 | Goddard Imel | |
| 2017/0027131 | A1 | 2/2017 | Brownridge | |
| 2017/0188542 | A1 | 7/2017 | Dix | |
| 2020/0289861 | A1 | 9/2020 | Venturini | |

* cited by examiner

WHEEL(S)

101

101

107

2007

2007

PET VESTIBULE

CROSS REFERENCE TO RELATED APPLICATIONS

This application is a Continuation of U.S. patent application Ser. No. 17/959,233, filed Oct. 3, 2022, which is a Continuation of patent application Ser. No. 17/724,193, now U.S. Pat. No. 11,457,607, filed on Apr. 9, 2022, which is a Continuation-in-Part of U.S. patent application Ser. No. 16/884,595, filed May 27, 2020, which is a Divisional application of U.S. patent application Ser. No. 15/350,857, filed Nov. 14, 2016, and issued as U.S. Pat. No. 10,709,106 on Jul. 14, 2020, and which claims the benefit of U.S. Prov. Pat. App. No. 62/273,714, filed Dec. 31, 2015. The entire disclosures of all of the foregoing are incorporated herein by reference.

BACKGROUND

1. Field of the Invention

This disclosure relates to animal management, and more particularly to a vestibule or staging area for transitioning animals from outdoors to indoors.

2. Description of the Related Art

Many families want their household pets to live indoors with the family. This provides the animal with socialization opportunities, warmth, security, and clean food and water. However, many household pets still have a need to go outdoors, such as for play or elimination. The family can either let the animal out and back in on demand, or install devices that allow the animal to come and go as it pleases.

Letting the animal out and in on demand has advantages, such as controlling when the animal comes back in, and thus providing an opportunity for reducing mud and other materials from being tracked in from outdoors by cleaning the animal when it comes in. However, the family cannot let the animal out and in when not at home, and the animal may need to go outside, such as for elimination, when nobody is available to let it out. Some families solve this through crate training, but not all animals tolerate crate training and not all families are willing to crate their pets.

An alternative commonly used is a "pet door" or "doggy door," which is typically a hole cut in an exterior door with a heavy flap covering it. The hole is large enough for the animal to pass through by nosing the flap aside and hopping through, but usually too small for a human intruder. Pet doors allow the animal to come and go as it pleases, but also have disadvantages, such as not being able to clean off the animal before it comes in. This is often addressed by having the doggy door lead to a portion of the home's interior that is isolated from the rest of the home, where the animal can run free but contain the mess. Examples include kennels built into garages and mud rooms.

However, another flaw with pet doors is that, during inclement weather, wind and rain can blow through the door. Since pet doors often lead to isolated areas of the home, this can cause water build up, and may chill the animal or damage the interior of the home. What is needed is an apparatus that preserves the come-and-go flexibility of a doggy door but provides a buffer between the interior and exterior environment.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a pet vestibule configured for disposing adjacent to a door, and having ingress/egress means disposed so as to inhibit exterior elements from passing through the door.

A pet vestibule comprising: an open side configured to attach to a residential house door having a pet door therein such that the perimeter of the open side is generally flush to the exterior door and the perimeter surrounds the pet door; a wall side opposing the open side and generally parallel thereto; a vestibule door side extending from the open side to the wall side, the vestibule door side comprising a wall with an opening therein configured to accommodate the passage of an animal and forming a vestibule pet door; a second wall side opposing the door side and extending from the open side to the wall side; and a top side connected to the open side, the wall side, the door side, and the second wall side; wherein the open side, the wall side, the door side, the second wall side, and the top are attached in the configuration of a right trapezoidal prism.

In an embodiment, the top is translucent.

In another embodiment, the top is transparent.

In a further embodiment, when the vestibule is installed on a residential door, the top side slopes downwardly away from the residential door.

In a still further embodiment, the top extends outwardly from the door side, the wall side, and second wall side.

In a still further embodiment, the top is hingedly attached to the vestibule.

In a still further embodiment, a flap is hingedly disposed in the vestibule pet door.

In a still further embodiment, the vestibule further comprises a sealing means for inhibiting rain runoff from a door from entering the vestibule.

In a still further embodiment, the sealing means is selected from the group consisting of: a gasket and a door sweep.

In a still further embodiment, the vestibule further comprises one or more wheels attached to the vestibule.

In a still further embodiment, the vestibule further comprises a bottom floor side opposing the top side.

In a still further embodiment, the vestibule further comprises an interior electrical light.

In a still further embodiment, the vestibule further comprises an interior warming element.

In a still further embodiment, the vestibule further comprises one or more height-adjustable leg assemblies.

Also described herein, among other things, is a pet vestibule installation system for installing a temporary pet vestibule to the outside of an exterior residential door having a pet door therein, comprising: a pet vestibule having an open side defined by a perimeter frame having a vestibule flange element attached thereto; a frame mountable to the residential door and having a flange portion sized and shaped to accept the vestibule flange element; wherein when the pet vestibule is installed on the residential door via the pet vestibule installation system, the pet door is surrounded by the perimeter frame.

In an embodiment, the vestibule flange element is generally in the configuration of a U-shape, and the frame flange portion is generally in the configuration of a U-shape.

In an embodiment, the frame is mountable to the residential door via one or more holes in the frame configured to accept mounting hardware.

Also described herein, among other things, is a method for installing a pet vestibule installation on a door comprising: providing a door having a pet door therein; providing a pet vestibule having an open side defined by a perimeter frame having a vestibule flange element attached thereto; providing a mounting frame having a flange portion sized and shaped to accept the vestibule flange element; affixing the mounting frame to the door to define a space between the flange portion and the door; inserting the vestibule flange element into the defined space.

In an embodiment, the vestibule flange element is generally in the configuration of a U-shape, and the mounting frame flange portion is generally in the configuration of a U-shape.

In an embodiment, the mounting frame is affixed to the door by affixing mounting hardware to the door through holes in the mounting frame.

DESCRIPTION OF THE PREFERRED EMBODIMENTS

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

Figure 1:
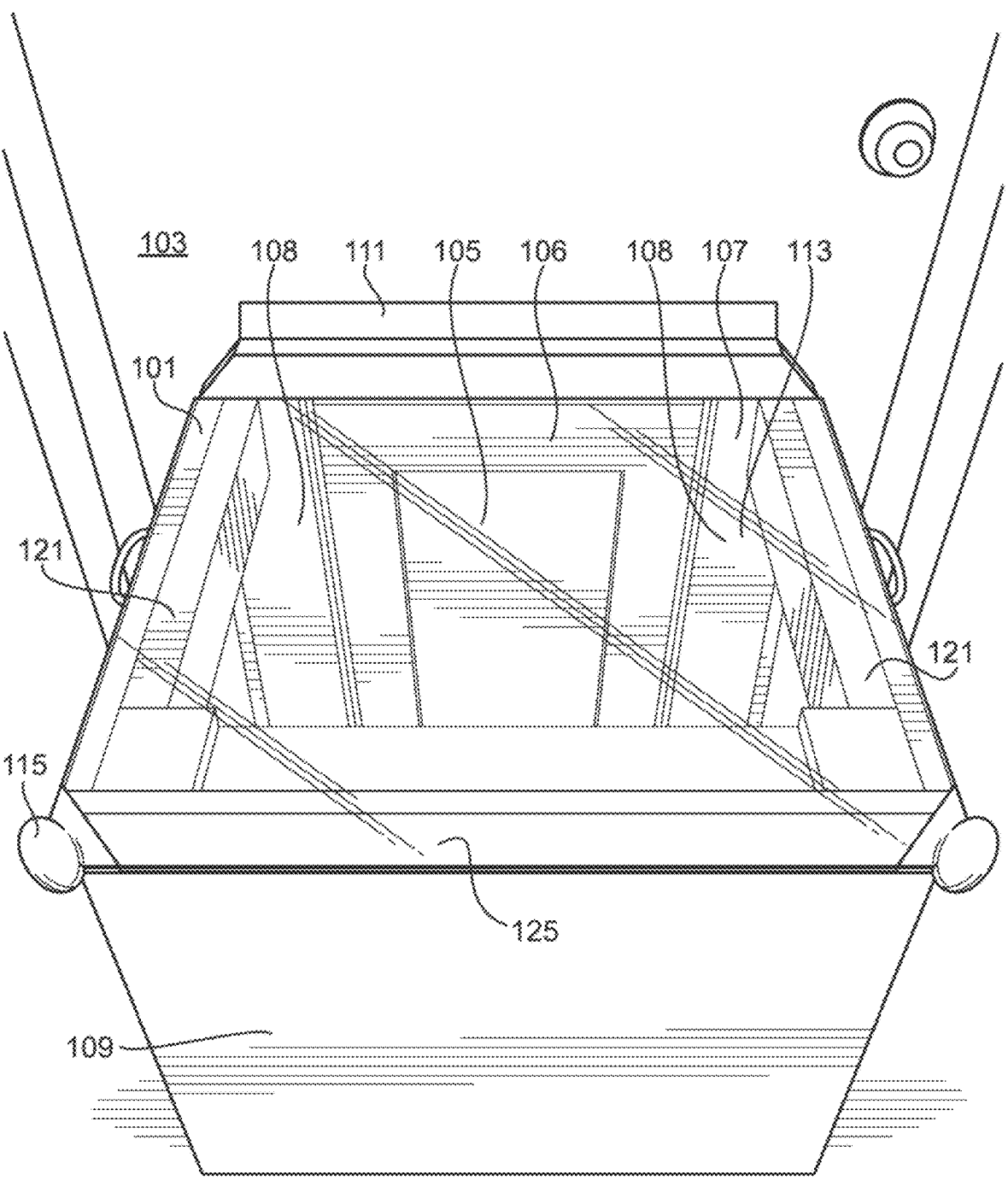
FIG. 1 depicts a top perspective view of an embodiment of a pet vestibule.

FIG. 1 depicts an embodiment of such a vestibule. In the depicted embodiment, a vestibule (101) is disposed adjacent to a conventional door (103) for human passage to and from a structure. The depicted door (103) is an exterior door (103) but the device (101) described herein is suitable for use with interior doors as well. The door (103) includes a pet door or "doggy door" (105) comprising a hole through the door (103) fully or partially covered by a movable flap. The flap typically is attached to the top of the hole and hangs down so that an animal may easily move it aside, and the pull of gravity will cause the flap to move back to a resting position that generally covers the hole once the animal has passed.

Figure 2:
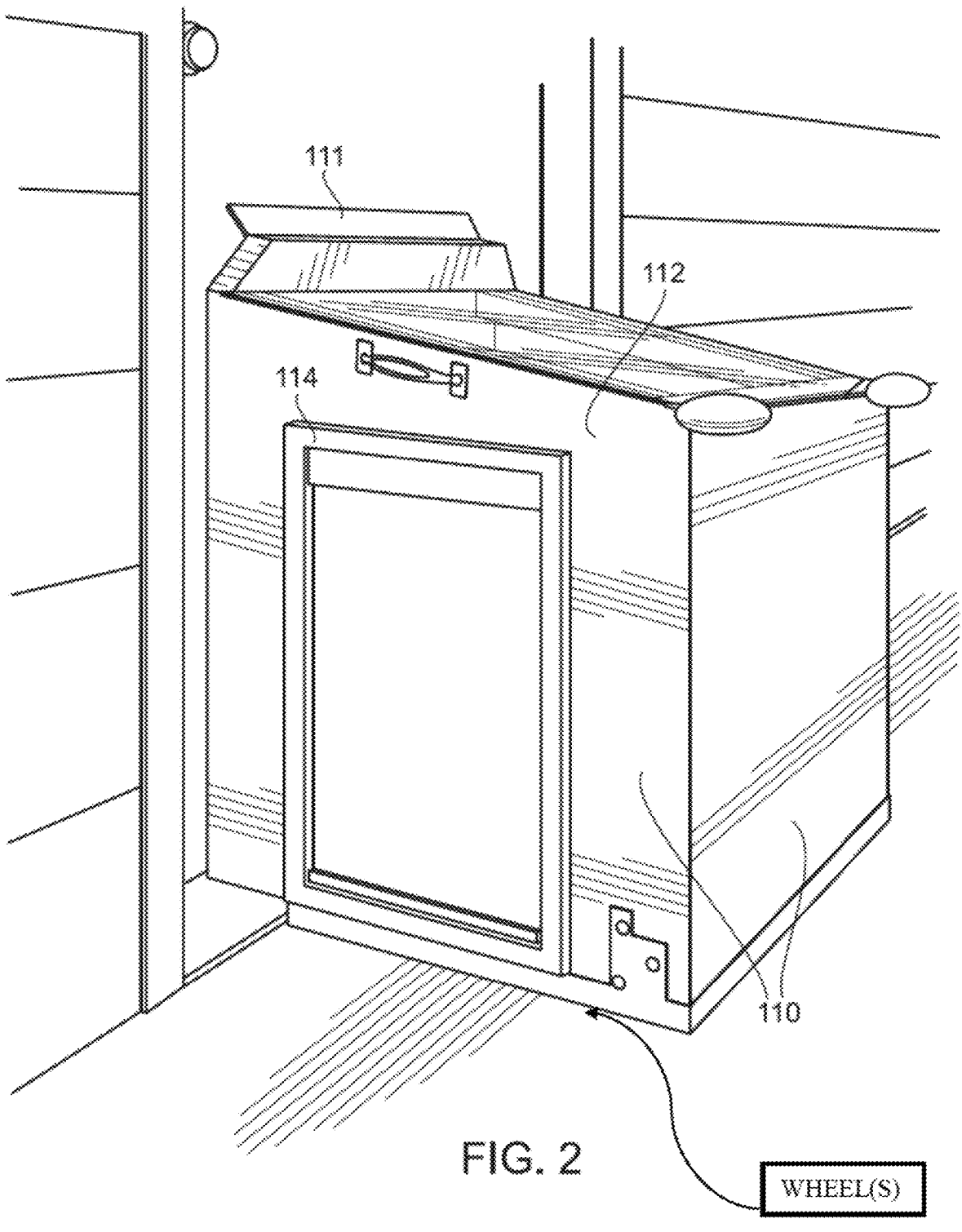
FIG. 2 depicts a side view of the embodiment of FIG. 1.
Figure 4:
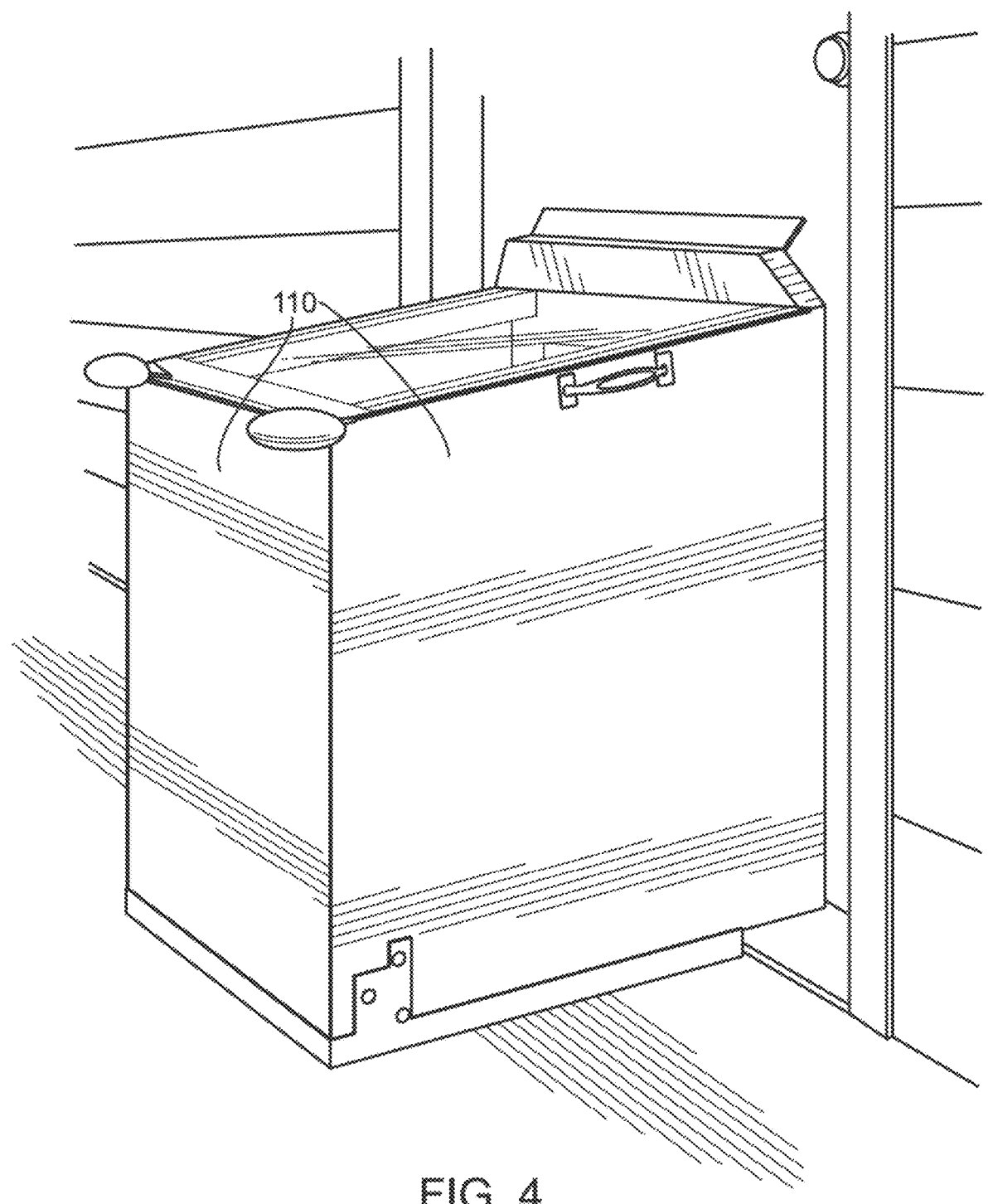
FIG. 4 depicts the alternate side view of the embodiment of FIG. 1.

The depicted vestibule (101) generally is in the configuration of a rectangular prism having a sloped top (113), forming a right trapezoidal prism in which the top (113) is the primary angle component and the other sides are generally orthogonal. See FIGS. 2 and 4. The slope provides for runoff of precipitation and is generally angled such that when the vestibule (101) is disposed against a door (103), runoff is directed away from the door (103). The depicted top (113) is made from a flexible transparent material, such as a transparent hard plastic. The transparency provides for natural lighting within the vestibule (101), which may help animals see when in the vestibule (101), reducing skittishness, and also allows for humans outside to quickly inspect the interior of the vestibule (101) for the presence of an animal without having to get down on hands and knees to peek inside. By using a hard plastic instead of glass, manufacturing cost is decreased and there is reduced risk of the top (113) shattering if the vestibule (101) is hit, such as by objects blown by the wind or thrown by a mower.

The depicted top (113) further comprises bumpers (115) on the corners, which soften edges to reduce injury to humans or animals, or damage to other objects, if the device (101) is struck. The top (113) may in certain embodiments be hingedly attached to the vestibule (101), or may be removable therefrom, which aids in the ease of cleaning and replacement. It is generally preferred that the connection between the top (113) and the frame (121) of the vestibule (101) be airtight and/or watertight, or nearly so, to further reduce intrusion of exterior elements. Also, in the depicted embodiment, the top (113) is larger than the frame (121), causing a portion of the top (113) to overhang past the frame (121) on at least one side. In the depicted embodiment, this overhang (125) is on the lowest end of the top (113), causing runoff drip on the ground, and not onto the frame (121). This also reduces leakage into the unit (101) from surface tension, which may cause liquid to cling to the underside of the top (113).

In the depicted embodiment of FIG. 1, the top (113) overhangs (125) primarily on one side, but in alternative embodiments, the top (113) may overhang on 2, 3, 4, or more sides, depending on the specific geometry of the vestibule (101). In the depicted embodiment, the top (113) is made of Plexiglass®. It should be noted that while a transparent and/or translucent top (113) is depicted, the top (113) may be opaque in other embodiments, and may be covered by further weatherproofing elements such as shingles.

The main body (109) of the vestibule (101) is essentially a three-sided box (109) having a fourth, open side (107). The open side (107) is configured for being disposed against the door (103) such that the open side (107) partially or fully covers the pet door (105), allowing an animal to pass through the pet door (105) and into the vestibule (101) or vice versa. The open side (107) may be partially closed, such as with framing elements, which are configured to cooperate with the pet door (105). For example, in the depicted embodiment of FIG. 1, the pet door (105) comprises a decorative frame (106), and the open side (107) comprises framing elements (108) disposed to surround the decorative framing (106) of the pet door (105) when the door (103) is closed and the vestibule (101) is disposed against the door (103). This creates a tighter fit between the vestibule (101) and door (103), inhibiting exterior elements from entering the home through the pet door (105), and inhibiting exterior elements from entering the vestibule (101) in any gap between the door (103) and vestibule (101).

The other three sides (110) are generally enclosed, with one (112) of the three enclosed sides (110) having disposed thereon a vestibule pet door (114). The depicted vestibule pet door is, like the pet door (105) in the conventional door (103), essentially a hole in the side of the vestibule (101) fully or partially covered by a movable flap. The flap is preferably attached at the top of the hole so that after the animal passes, gravity will cause the flap to come to rest in a position fully or mostly covering the hole. The side (112) on which the vestibule pet door (114) is disposed is preferably not the side opposing the open end (107), but rather one of the sides (110) disposed orthogonally or diagonally therefrom. The reason for this is that if the two pet doors (105) and (114) are disposed in a straight line, wind and rain can more easily penetrate the interior of the home through the vestibule (101). However, by disposing the vestibule pet door (114) off to the side, a straight line wind may push aside the flap and blow into the vestibule (101), and rain may enter, but both are less likely to be at the proper angle to also penetrate the pet door (105) and get into the home. Preferably, the vestibule pet door (114) is also on a side of the vestibule (101) away from the direction of the prevailing winds (typically west-to-east), further reducing wind intrusion.

In the depicted embodiment, the top end of the open side (107) comprises a sealing means (111), such as a rubber gasket or door sweep (111) which may be disposed on the device (101) so that when the door (103) is closed, the sealing means (111) inhibits runoff from the door (103) from flowing into the vestibule (101). For example, a door sweep (111) may be disposed inverted to catch runoff and direct it to the top (113), where it can then flow to the far, low end of the top (113) and drip onto the ground. Other sealing means may also, or alternatively, be employed, such as foams or caulk. However, non-permanent sealants are preferred so that the door (103) may continue to be operated to allow human ingress/egress.

Figure 3:
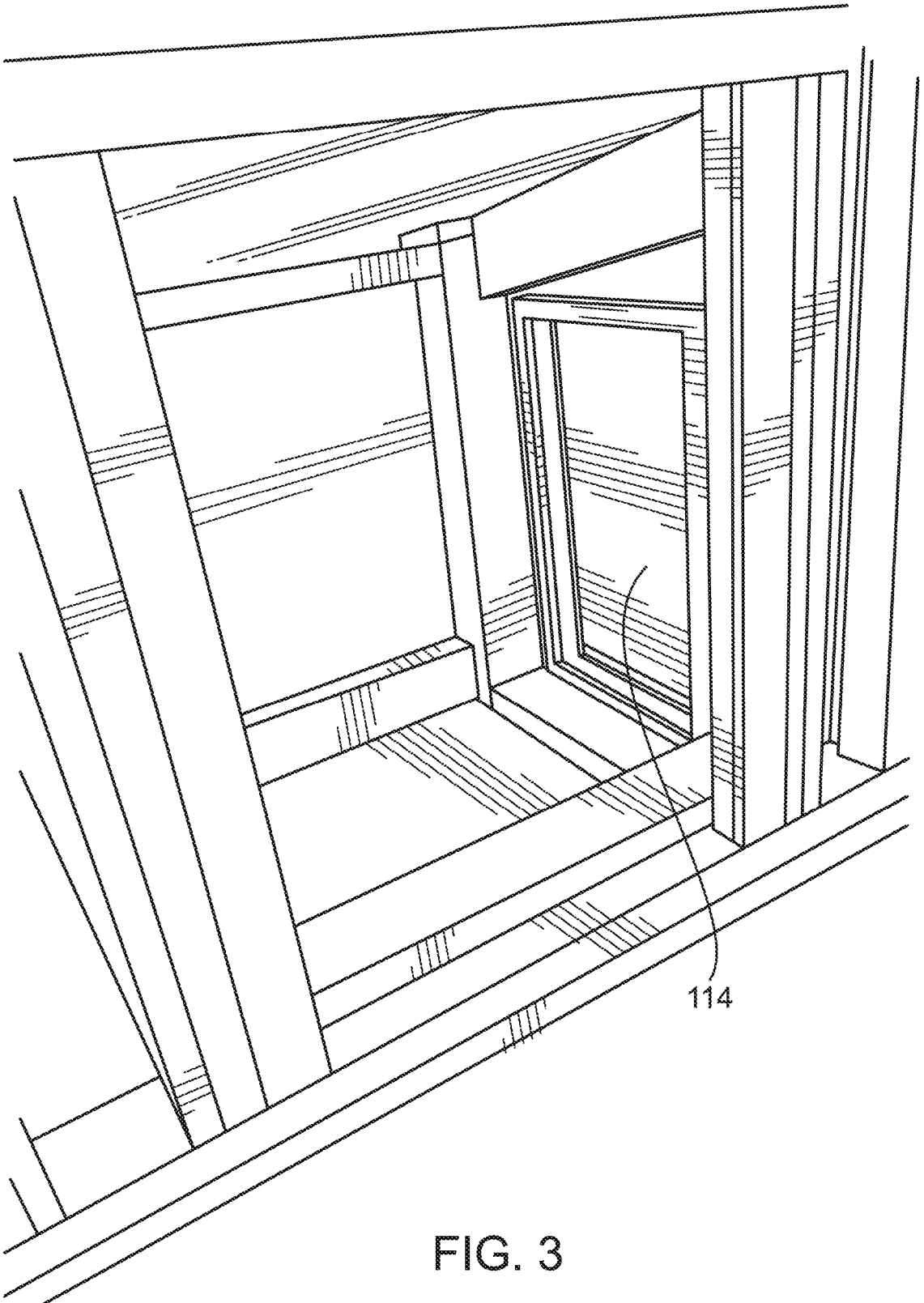
FIG. 3 depicts a rear view of the embodiment of FIG. 1.

Generally, the depicted vestibule (101) is not attached to the door (103). That is, the vestibule (101) is disposed snugly adjacent to the door (103), but not attached to the door (103), so that if the door (103) is opened, the vestibule (101) remains in place. This can be seen in FIG. 3. In effect, the door (103), when closed, comprises the fourth enclosed wall or side for the open end (107). This allows the door (103) to be used for human ingress/egress, as the human can step past, around, or over the vestibule (101). The dimensions and shape of the vestibule (101) may vary from a rectangular prism to accommodate structures associated with the door (103), such as the jambs and/or threshold.

In a further embodiment, the vestibule (101) may comprise lockable casters, rollers or other movement means so that it (101) can be rolled away from the door (103) to improve the ease of human ingress/egress, and then easily moved back into place. This also has the advantage of elevating the bottom of the vestibule (101) off the surface so it (101) does not react with the surface, which may cause rotting, deterioration, and/or discoloration. In such an embodiment, the bottom ends of the sides (110) and/or (107) may also comprise a sealing means, such as a door sweep, to inhibit water from entering the vestibule (101) from the gap caused by the casters or rollers.

The depicted vestibule (101) is constructed using a wood-frame structure, but other materials and construction techniques are possible as well within the scope and spirit of this disclosure. For example, the top (113) may be shingled and the sides may be sided to match the overall exterior appearance of the home, making the vestibule (101) appear more attractive and "built-in."

In a still further alternative embodiment, the vestibule (101) may be attached to and supported by the door (103) such that when the door (103) opens, the vestibule (101) swings with it. In such an embodiment, the vestibule (101) is sized and shaped to pass through the door (103) opening through the angle. This generally comprises a right triangular configuration.

The vestibule (101) may further comprise other elements, such as interior lighting, warming elements, and/or drying elements. For example, in the depicted embodiment, the vestibule (101) has an open bottom with no separate floor, meaning the animal steps into the vestibule (101) and its paws rest on the decking material or other ground material beneath the vestibule (101). However, in an alternative embodiment, a separate vestibule (101) floor may be included, which may comprise a material or texture for drying or cleaning animal paws, which are known in the art. Such flooring material may be removable for easy replacing or washing.

Figures 5, 6:
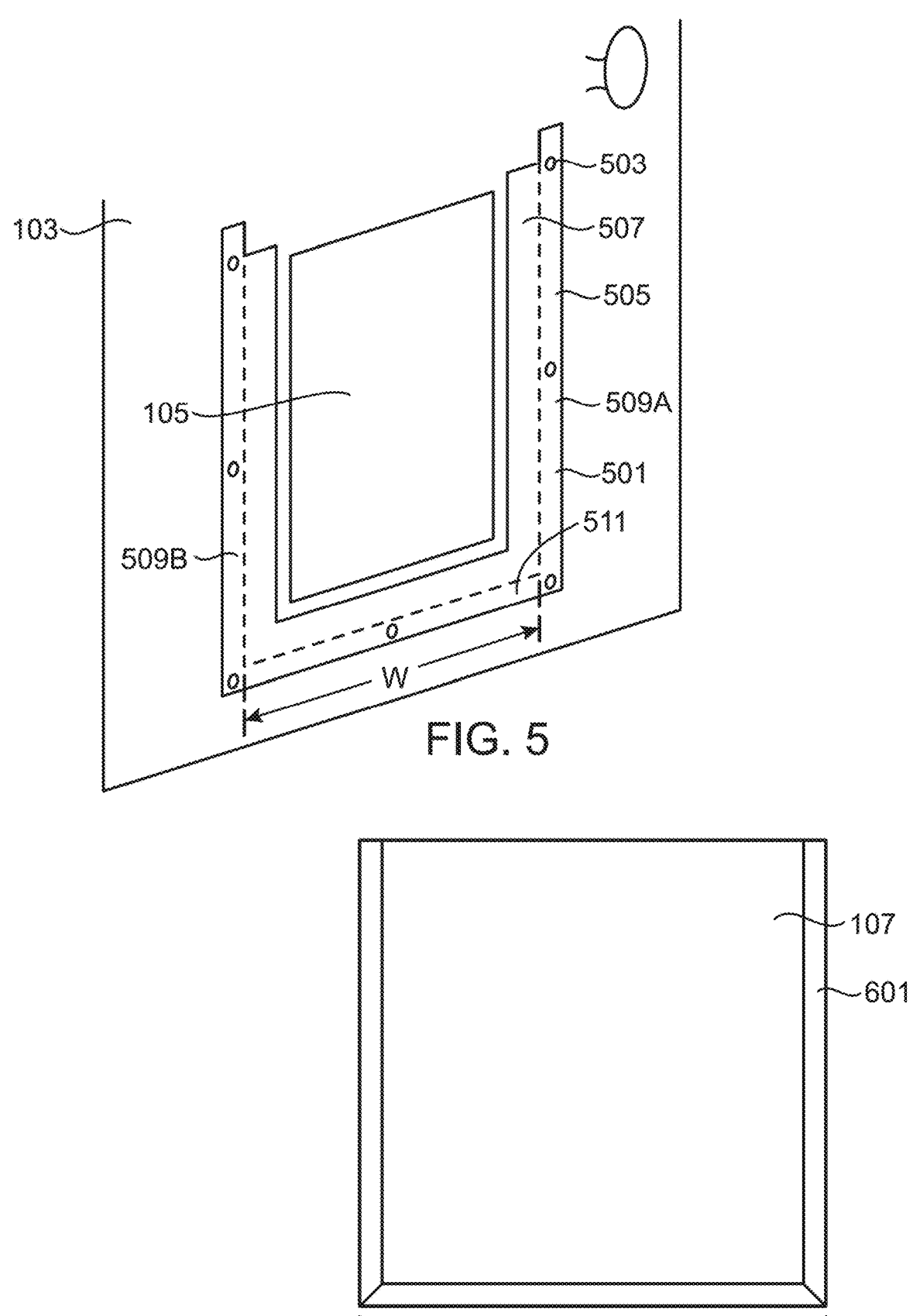
FIG. 5 depicts an isometric view of an embodiment of a temporary mounting system for a pet vestibule according to the present disclosure.
FIG. 6 depicts a front elevation view of an embodiment of a temporary mounting system for a pet vestibule according to the present disclosure.

In many installations, it may be desirable to be able to quickly attach or remove the vestibule (101) from a door. For example, the vestibule (101) or door require repair, replacement, or cleaning, these tasks are generally simpler if the vestibule can be removed. FIGS. 5 and 6 depict an embodiment of a temporary installation system for a pet vestibule (101) according to the present disclosure. In the depicted embodiments of FIGS. 5 and 6, the open side (107) of the pet vestibule (101) is attached to the door (103) using a tongue-in-groove system. A generally U-shaped frame (501) is attached to the side of the door (103) to which the vestibule (101) is to be installed. This may be done using any attaching technique known in the art. In the depicted embodiment, the frame (501) has a plurality of holes at various points through which a hardware fastener (503) may be inserted to hold the frame (501) against the door (103). Nails, screws, bolts, and other fasteners may be used. Generally, weather-resistant components are desirable, and the connection may be further reinforced with weatherproofing, such as by use of a silicone sealant.

The frame (501) is generally U-shaped, having two lateral arms (509A) and (509B), both generally linear elements, disposed vertically from, and generally perpendicularly to, a generally linear base (511). Each of the arms and base (509A), (509B) and (511) are comprised of an attaching portion (505) and a flange portion (507). The attaching portion (505) is disposed to the outside of the flange portion (507), and contains the holes (503) used to attach the frame (501) to the door (103). Thus, the flange portion (507) forms an interior U-shaped structure slightly smaller than the U-shape of the attaching portion (505). Whereas the attaching portion (505) is generally planar and attaches flush against the door (103), the flange portion (507) is configured to be disposed a small distance away from the door (103), or to be bendable and flexible so that the flange portion (507) can be bent away from the door (103) to allow a corresponding flange element (601) of the vestibule (101) to be inserted between the door (103) and flange portion (507), as described elsewhere herein. The width w of the flange element (601) that can be fitted into the U-frame (501) is generally defined by the lateral distance between the outside edges of the flange portions (507) of the arms (509A) and (509B).

Generally, the U-shaped frame (501) is installed to surround the pet door (105) on three sides, with the base (511) disposed below the pet door (105) and the arms (509A) and (509B) extending upward on either side of the pet door (105). This is so that when the vestibule (101) is installed, as described elsewhere herein, the pet door (105) will lead to the interior of the vestibule (101). Thus, the dimensions of the U-frame (501) will depend on the size of the pet door (105). In an embodiment, the width w is twenty-four inches.

Correspondingly, the vestibule (101) may be configured with a flange element (601) configured and disposed on the vestibule (101) so as to interconnect and interlock with the flange portion (507) of the U-frame. In FIG. 6, a logical diagram of the open side (107) of the vestibule (101) is shown, with a U-shaped flange element (601) disposed on the lateral sides and bottom. This flange element (601) is sized and shaped so that when the vestibule is attached to the door, the lateral sides of the U-shape flange element (601) slide between the flange portion (507) of the arms (509A) and (509B) and the bottom of the U-shaped flange element (601) slides into the flange portion (507) of the bottom (511) of the U-frame (501). Gravity then holds the vestibule (101) in place. The width and thickness of the flange element (601) is generally designed to coordinate with the configuration of the flange portion (507) of the U-frame (501). Thus, the lateral width w between the outside edges of the lateral arms of the U-shaped flange element (601) is about the same as the lateral width w of the flange portion (507).

It will be understood by one of ordinary skill that the open side (107), though open to allow passage of an animal there through, still comprises structural and framing elements to which the flange element (601) can be attached.

In an embodiment, it may be desirable to provide additional support for the vestibule (101) to reduce the stress on the door (103). Because the vestibule (101) is attached to the door and otherwise "floats" over the ground, the strain of the vestibule's weight is carried by the door (103). To reduce this strain, which over a period of time could result in door failure, legs and/or feet may be attached to the vestibule (101) to provide a distal point of ground support, reducing the force on the door (103).

Figure 7:
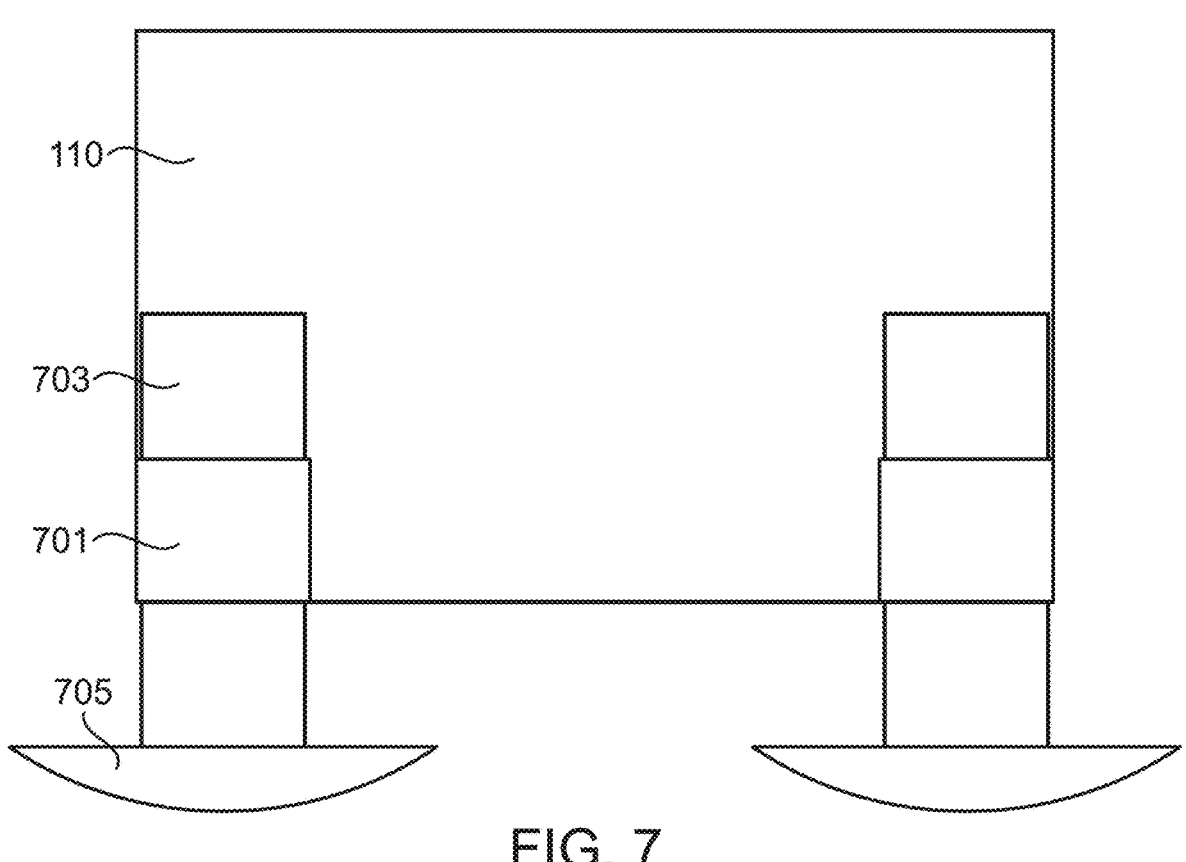
FIG. 7 depicts a diagram of an embodiment of adjustable support legs for a pet vestibule according to the present disclosure.
Figure 8:
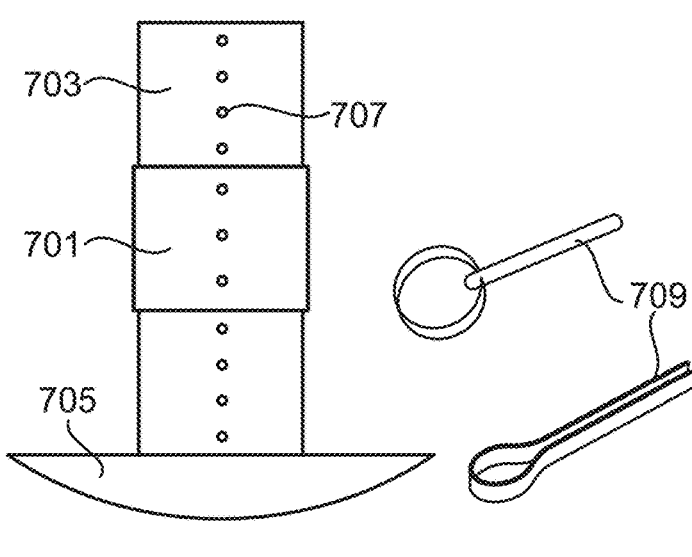
FIG. 8 depicts a diagram of an embodiment of adjustable support legs for a pet vestibule according to the present disclosure.
Figure 9:
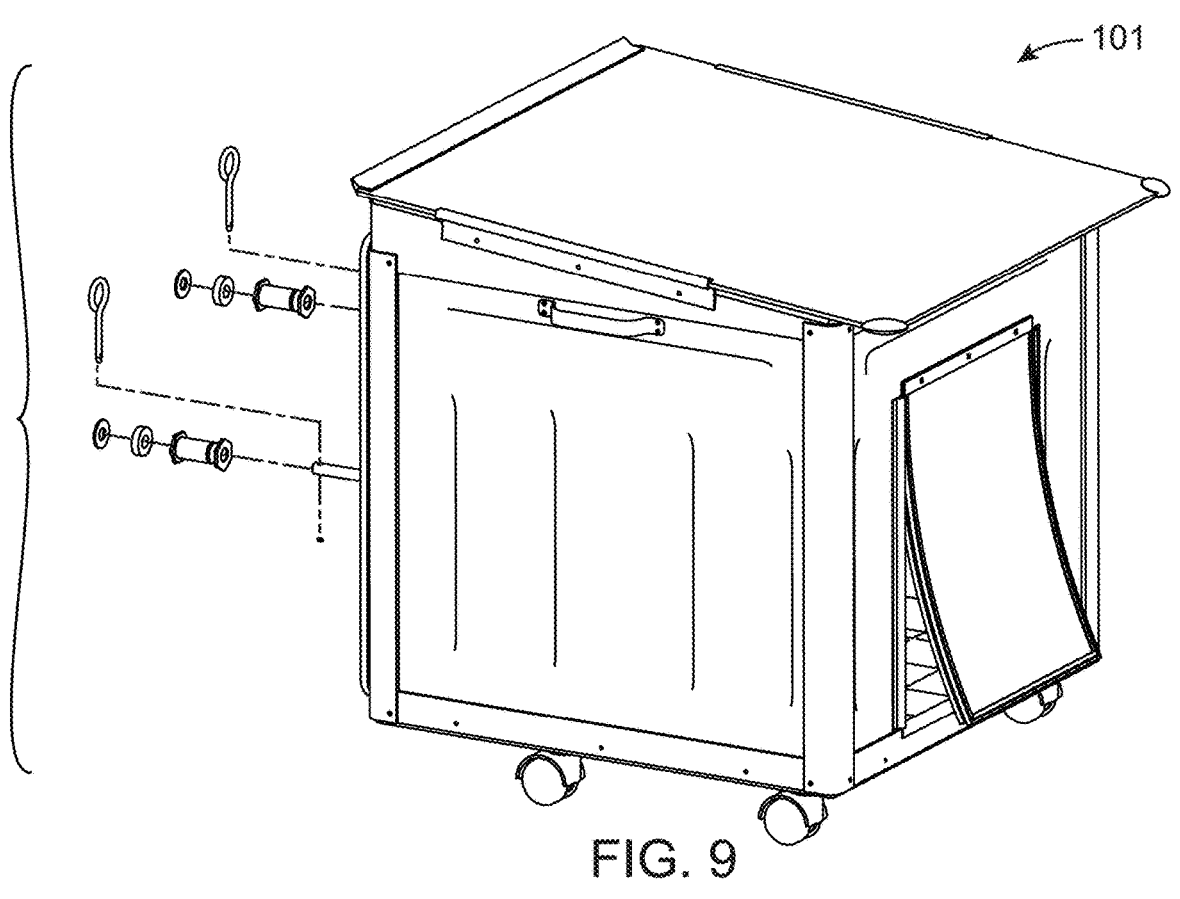
FIG. 9 depicts an assembled but uninstalled embodiment of a modular construction, flat-packable vestibule with roll-away attachment features.
Figure 10:
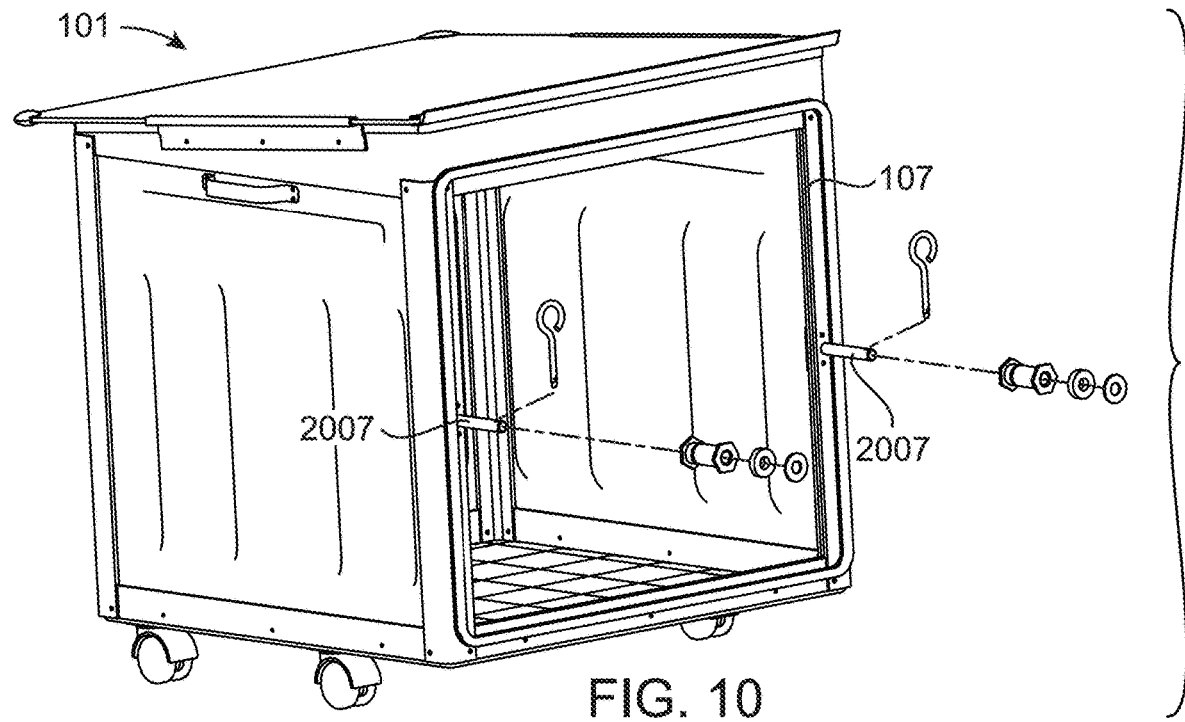
FIG. 10 depicts a reverse view of the vestibule of FIG. 9.

FIGS. 7 and 8 depict an embodiment of such a leg/foot structure. In the depicted embodiment of FIG. 7, the side (110) of the box (109) opposite the open end (i.e., the side (110) disposed most distal from the point of attachment to the door (103)) comprise a leg (703) assembly. The depicted leg (703) assembly comprises a sleeve (701) generally in the configuration of a hollow cube or rectangular prism, attached to the vestibule (101) so that the open sleeve (701) is disposed vertically to the pull of gravity. A leg (703) is inserted through the sleeve (701). The depicted leg (703) is generally a rectangular post, sized and shaped to be snugly, but movably inserted into the sleeve (701). The leg (703) is preferably long enough to pass through the sleeve (701) and touch the ground at one end, while also having at least some length of the leg (703) extending from the top of the sleeve (701) at the opposing end. This provides more stability and reduces stress and breakage.

The bottom of the depicted leg (703) terminates in a foot (705) component disposed between the leg (703) and ground. This foot (705) component is generally a low-friction component, as it will slide over the decking, ground or other material outside the door (103) when the door (103) is opened. The depicted foot (705) has a rounded shape to reduce the amount of material of the foot (705) contacting the ground/floor, and may be made of a soft or low-friction material. In the depicted embodiment of FIG. 7, two such leg and sleeve assemblies are shown, but in an embodiment, the vestibule (101) may comprise one, two, three, or more such assemblies. The assembly may be attached to the interior or exterior of the side (110), and may also, or alternatively, be attached to other sides (110) of the vestibule (101) in an embodiment.

FIG. 8 depicts an adjustable leg assembly. The depicted adjustable leg assembly has generally the same components as that described with reference to FIG. 7, except that the sleeve (701) and leg (703) each have a series of vertically aligned holes (707). The holes (707) are disposed on the sleeve (701) and leg (703) in coordinating positions such that a fastener (709) inserted through a hole in the sleeve (701) may also be inserted into a hole (707) in the leg. The height of the leg (707) can be adjusted by sliding the leg (707) to the desired height and inserting a fastener (709) through the aligned holes of the sleeve (701) and leg (707) to hold the leg in place. Any appropriate fastener may be used, but two exemplary fasteners (709) are depicted in FIG. 8, namely, a quick-release pin with a finger ring, and a cotter pin.

In some situations, it may be desirable for the vestibule to be detachment from the door so that the vestibule can be rolled away from the door. For example, doors often open into a room or structure, and if the vestibule is attached, it may catch on the doorjamb or become a tripping hazard in the case of an emergency. However, it is also important that the vestibule not be easily removable or detachable from the door from outside, as this would compromise its function as a deterrent to unwanted entry by intruders or pests. In an embodiment, the vestibule may use an alternative attaching system that allows for quick, ease detachment from inside the structure, but not from outside the structure.

One such embodiment is depicted in FIGS. 9, 10, 11, 12, 13, and 14. In this depicted embodiment, the vestibule (101) further comprises one or more posts (2007) attached to the open side (107). The depicted posts (2007) are generally in the configuration of cylinders protruding generally perpendicularly outward from the open side (107) at opposing sides of the perimeter frame (2004). The depicted posts (2007) are in generally horizontal alignment on lateral sides of the perimeter frame (2004), but this is by no means limiting and other configurations are possible. The posts (2007) may be affixed to the vestibule (101), or may be monolithically constructed with a vestibule element, such as a corner frame (2008) as described elsewhere herein. The posts (2007) comprise a through bore sized and shaped to receive and accommodate an attaching means, such as a cotter pin (2165).

Figures 11, 12, 13:
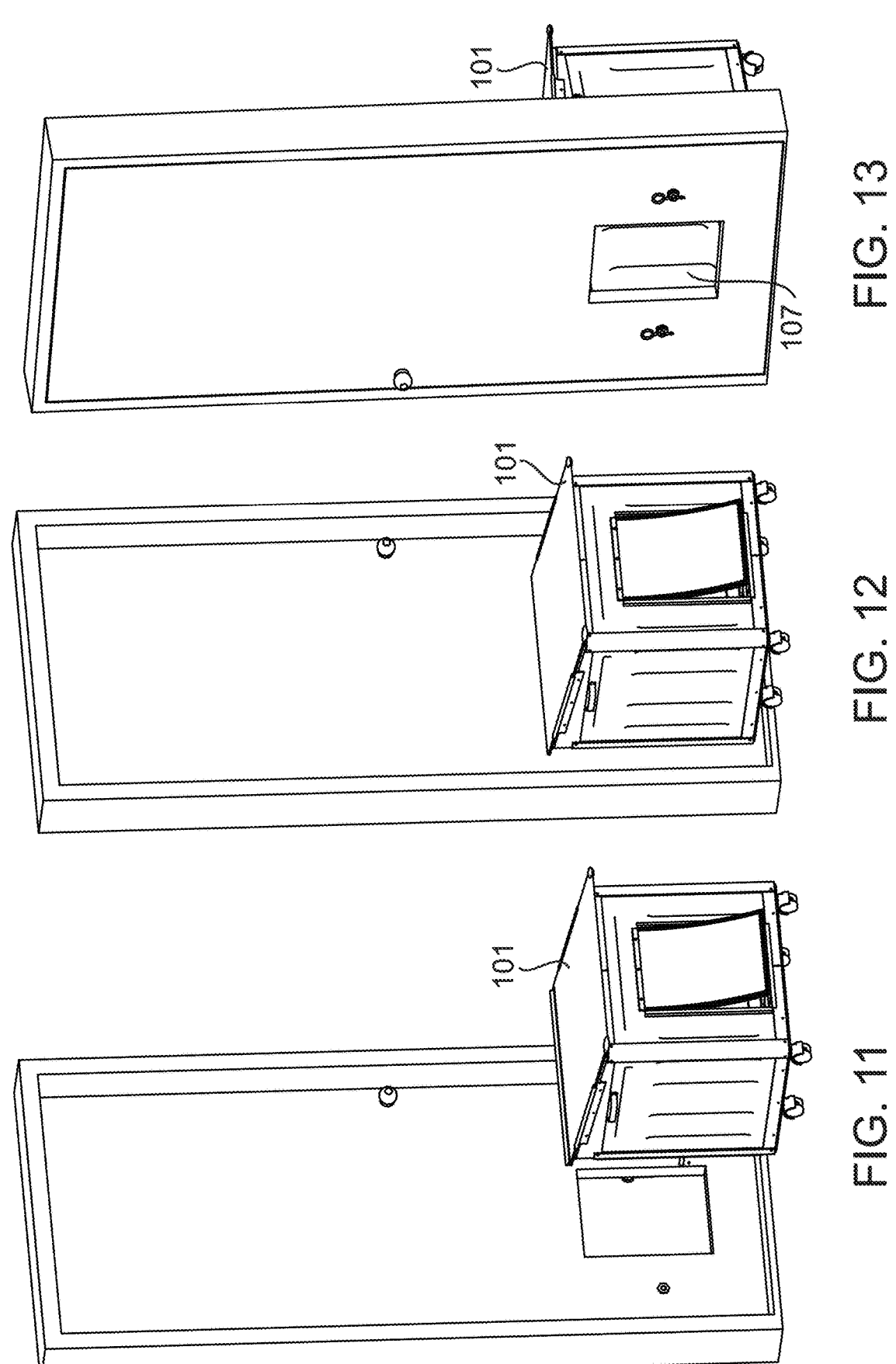
FIG. 11 depicts the vestibule of FIG. 9 prior to attachment to a door.
FIG. 12 depicts the vestibule of FIG. 9 attached to a door.
FIG. 13 depicts a reverse view of the vestibule of FIG. 9 attached to a door.

To attach the vestibule (101) to a door (103), holes are drilled through the door at locations near the pet door opening corresponding to the locations of the posts (2007) when the vestibule (101) is adjacent to the door (103) exterior, as can be seen in FIG. 13. These holes are preferably slightly larger than the diameter of posts (2007). The vestibule (101) is then pushed up against the door (103) and the posts (2007) protrude through the door to the interior side. The length of the posts (2007) is effective to cause a small amount of the post (2007) to protrude beyond the interior surface of the door (103). The through bore is disposed at or near the distal end of the posts (2007) such that when the vestibule (103) is installed, the through bore is disposed in portion of the posts (2007) protruding beyond the inferior surface of the door. This allows the attaching means (2165) to be inserted into the through bore. Because the length of the attaching means (2165) exceeds the diameter of the hole, the post (2007) cannot be withdrawn (i.e., the vestibule (101) cannot be disengaged from the door). This allows users inside the structure to operate the door by removing the cotter pins (2165) and pulling the door open. The door (103) will then swing open but the vestibule (101) does not move. It can then simply be wheeled out the way for egress and ingress. When the users are ready to re-attach the vestibule (101), it can be wheeled back into place and the door (103), causing the posts (2007) to once again protrude into the interior of the home through the drilled holes, and the cotter pins (2165) can be re-inserted, securing the vestibule (101) to the door (103).

In an embodiment, additional components may be utilized to further improve the attachment. For example, a protective sleeve (2165) may be inserted into the drilled holes through the door (103) to protect the interior door structure from damage and reduce weathering. Such a sleeve (2165) could be made from plastic or a metal, and has a hollow interior channel sized and shaped to receive the posts (2007). The body of the sleeve (2165) has a diameter smaller than that of the drilled holes but larger than that of the posts (2007). The opposing ends of the sleeve (2165) comprise flanges (shown as annual flanges in the FIGS.) with a diameter larger than that of the drilled holes, providing a bearing surface to hold the sleeves (2165) in place.

In the depicted embodiment, the sleeve (2165) is a multi-part element comprising a receiving element (2162) and an inserting element (2161). The receiving element (2162) has one flange, and the inserting element (2161) has a second flange. The depicted receiving element (2162) and inserting element (2161) are attachable to each other by the presence of corresponding threads circumscribing the interior surface of the receiving element (2162) and the exterior surface of the inserting element (2161). The sleeve (2165) is assembled by inserting the receiving element (2162) into the drilled hole from the interior side of the door (103). The inserting element (2161) is then inserted into the receiving element (2162) from the exterior side of the door and rotated to engage the corresponding threads. The length of the bodies of both the receiving element (2162) and inserting element (2161) are generally the same as the thickness of the door (103) to which the vestibule (101) is to be attached, allowing for a tight, snug fit. In an embodiment, a weatherproof or weather-resistant gasket may be inserted on the body of the receiving element (2162) and/or inserting element (2161) adjacent the flange to provide protection against moisture intrusion through the drilled hole.

Once the sleeve is installed, the posts (2007) may then be inserted through them as described elsewhere herein with respect to the drilled hole, thus providing a stronger, firmer channel for the posts (2007) that will not damage the door (103). While a snug fit is desired between the post (2007) and interior channel of the sleeve assembly, it may be necessary to allow a small amount of play to accommodate the angle of the door swinging open, which will cause the sleeve channel to become non-coaxial with the posts (2007)

to a small extent. If the fit is too tight, the posts (2007) could become snagged or jammed in the sleeve channel. Additionally, in an embodiment, a gasket may be provided on the post (2007) body, usually adjacent the corner frame (2008), to provide additional protection against moisture penetration.

These elements should be made from a strong, weatherproof or weather-resistant material. Plastic is possible but metal is preferred for both improved weathering characteristics and strength to resist prying and breakage. In an embodiment, one or more spacing washers (2163) and/or gaskets (2164) may be used on the interior side of the door (103) for further bracing. That is, if the amount of post (2007) protrusion into the interior side is excessive, there will be some play between the through bore and the door surface, which can cause the vestibule (101) installation to be loose. This may result in unwanted noise during use or windy conditions, and may increase the likelihood of moisture intrusion. Thus, washers or gaskets may be placed on the portion of the post (2007) protruding past the interior side of the door (103) to provide a bearing surface for the cotter pin (2165) and ensure a snug connection in which the vestibule (101) does not rattle during use. This also facilitates the use of a single-length post (2007) to accommodate doors of differing thicknesses, which reduces manufacturing and inventory costs.

Another aspect of the embodiment depicted in FIGS. 9 through 14 is that the vestibule (101) is assembled from modular components with interchangeable sides. This both allows the product to be flat-packed for improved shipping and stocking efficiency, and provides the user the ability to customize and adjust which side will be open (i.e., attached to the door) and which side will contain the pet flap to allow animal egress and ingress.

For purposes of this disclosure, the term "flat-pack" means a form of packaging, shipping, distribution, and/or sale of furniture or other bulky products in which the separate components or elements of the product are packaged for shipping and sale in boxes in a fully or partially disassembled configuration that requires customer assembly. The package may include assembly directions, assembly hardware, and sometimes tools. Flat-packing allows bulky products to be more efficiently and cost-effectively packaged, shipped, and stocked, and is sometimes also referred to as "ready-to-assemble," "knock-down," or "kit" packaging. Flat-packaged furniture preferably requires only a fraction of the shelf and shipping volume of its assembled equivalent, usually achieving a reduction of at least 50% in volume, and preferably a reduction in volume in excess of 75% or more.

Figure 14:
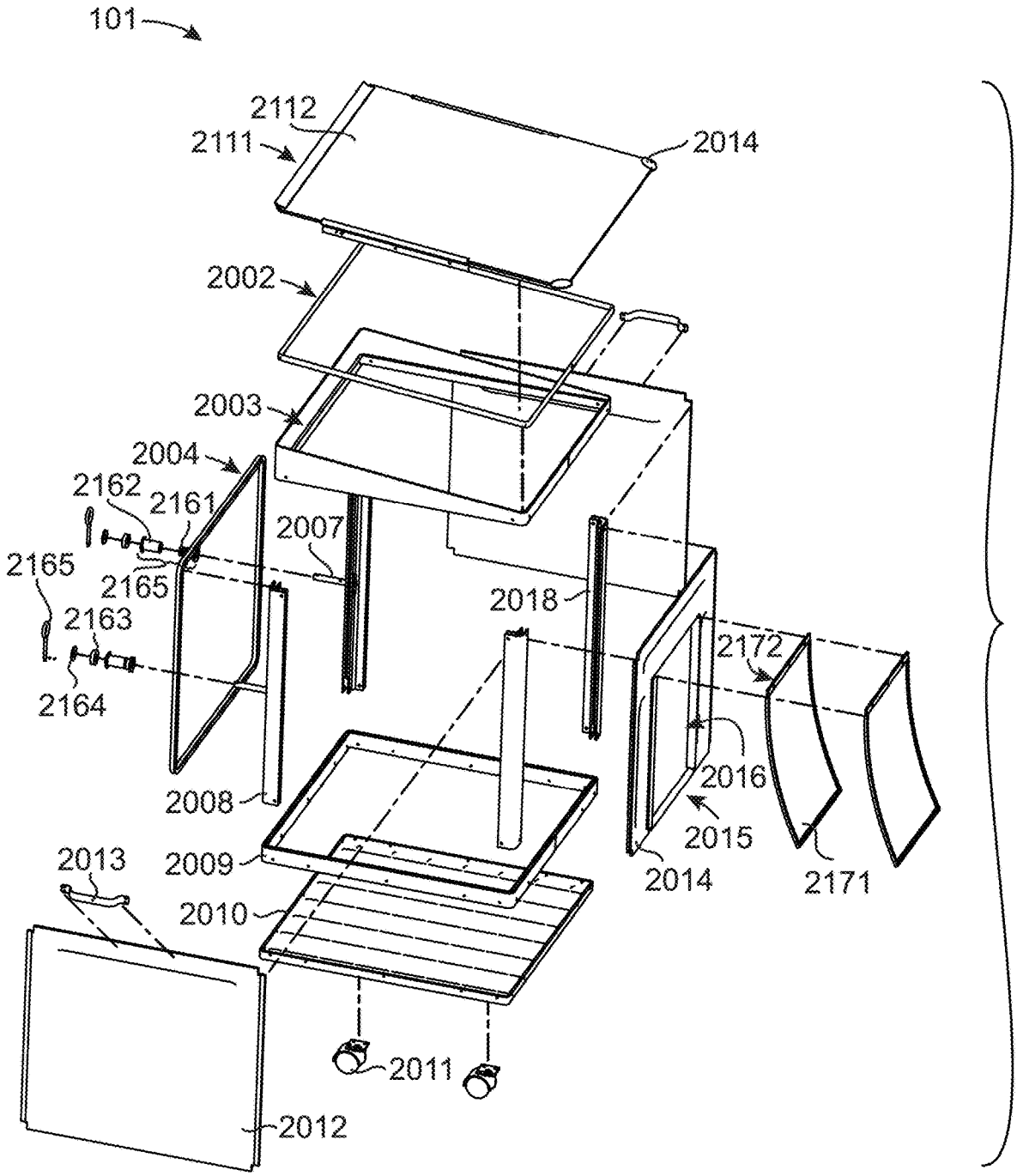
FIG. 14 depicts an exploded view of the vestibule of FIG. 9.

This feature is best illustrated in the exploded view of FIG. 14. In the depicted embodiment, the vestibule (101) is constructed from two proximal corner frames (2008) (i.e., with posts (2007) and two distal corner frames (2018) (i.e., without posts). In an embodiment, all four corner frames could be proximal corner frames with posts, and the post protruding from the side of the assembled vestibule (101) distal the door may be used for some other purpose or simply disregarded, but this presents a tripping and spearing hazard and is unsightly. Thus, the use of post-less distal corner frames (2018) is preferred.

Except for the posts (2007), the corner frames (2008) and (2018) have a generally L-shaped cross-section comprising two legs connected at about a 90-degree angle with a rounded corner. The each of the distal ends of the legs define a U-shaped channel configured for receiving an edge of a wall element (described elsewhere herein). The top and bottom ends of the corner frames (2008) and (2018) likewise comprise U-shaped channels facing upward and downward, respectively, configured for receiving the top frame (2003) and the bottom frame (2009), respectively.

The depicted bottom frame (2009) is a rectangular or square frame sized and shaped to be disposed atop the bottom of the floor element (2010) of the vestibule (101). The bottom frame (2009) provides additional structural rigidity and inhibits moisture penetration into the vestibule (101) interior. The bottoms of the corner frames (2008) and (2018) have through bores aligned with corresponding through bores in the corners of the bottom frame (2009) and the lateral outer sides of the floor element (2010), allowing the use of hardware to connect these three components together at the corners. Likewise, additional corresponding through bores may be present along the sides of the bottom frame (2009) and floor (2010) for further hardware affixation.

The top frame (2003) is installed in similar fashion by receiving its corners in the top U-shaped channels of the corner frames (2008) and (2018) and affixing it in place with hardware using corresponding through bores. However, before the top frame (2003) is placed, the walls are installed. The depicted product configuration comprises three different types of walls. A first type of wall is a solid wall element (2012), which is simply a rectangular or square panel sized and shaped to be slid between any two adjacent corner frames (2008) and/or (2018). The bottom of the solid wall element (2012) is received in corresponding U-shaped channels on the top perimeter of the bottom frame (2009), resulting in three of the four sides of the solid wall element (2012) being received in a channel. The depicted solid wall element may further be outfitted with an attachable handle (2013) for easy rolling of the assembled vestibule (101).

A second type of wall element is a pet door wall (2014), which is essentially identical in configuration to a solid wall element (2012), except that it includes an opening (2016)) for passage of an animal into and out of the vestibule (101) interior. This opening (2016)) may optionally have a flap (2171) attached to it, which may provide additional comfort and warmth against moisture and wind when an animal is within the vestibule (101). The flap (2171) includes a mounting element (2172) at a top thereof for attaching the flap (2171) to the pet door wall (2014) to cover the opening (2016)). It should be noted that the dimensions and other characteristics of the pet door wall (2014) are otherwise the same as those of the solid walls (2012), meaning the customer may choose any side of the vestibule (101) to install the pet door wall (2012), thereby customizing from which direction the pet can enter and exit the vestibule (101).

The third type of wall element is a frame (2004), which is reserved for the side of the vestibule (101) that will be attached to the door. Thus, when the vestibule (101) is being assembled, the two corner frames (2008) with posts (2007) should be installed adjacent each other with the posts generally parallel, and the perimeter frame (2004) should be installed on the side from which the posts project. The perimeter frame (2004) may be installed in the U-shaped channels in the same fashion as the other wall elements, or may be differently designed. In an embodiment where the perimeter frame (2004) is installed in the U-channels, the perimeter frame (2004) is attached before the top frame (2003). In the preferred embodiment, discussed below, the perimeter frame (2004) is attached after the top frame (2003).

The depicted top frame (2003) is an angled element generally in the configuration of an inclined plane or wedge, having a taller end intended to be disposed proximal the door (103), and a shorter end intended to be disposed distal the door (103). This provides a runoff surface for rain and other precipitation. The depicted top frame (2003) has a generally square or rectangular cross-section with generally the same dimensions and configuration as the bottom frame (2009), and the bottom surface of the top frame (2003) also has corresponding U-shaped channels for receiving the top edges of the wall elements (2012) and (2014). In an embodiment where the perimeter frame (2004) is installed using the U-channels, the top edge of the perimeter frame (2004) is likewise received.

The top frame (2003) may further comprise a top panel (2112) to prove an overhead roof for the vestibule interior. This top panel (2112) may comprise a mounting element (2111) configured for pivotably or removably mounting the top panel (2112) to the top frame (2003). The depicted top frame (2003) is generally in the configuration of a right trapezoidal prism, which imparts to the overall vestibule a right trapezoidal configuration. In the depicted embodiment, the Additionally and/or alternatively, the top panel (2112) may include or be made of a transparent material. These features allow a person outside the vestibule (101) to visually inspect the presence or condition of an animal in the vestibule (101) without bending down to look in through the pet door (2016)). The top panel (2112) may further comprise corner bumpers (2014) to inhibit accidentally injury from contacting the corners. Alternatively, the top panel (2112) may have an opaque surface, and/or be a hollow perimeter into which a transparent pane (2002) is mounted.

In the depicted embodiment, the perimeter frame (2004) is installed after the top frame (2003) and provides a weatherproofing function. The depicted exterior frame (2004) is installed on the exterior surface of the open side, and surrounds the opening into the interior of the vestibule (101), including a portion of the corner frames (2008) containing the posts (2007), which are disposed within the interior of the installed perimeter frame (2004) as shown in the FIGS. This configuration is preferred for further weatherproofing purposes. The open side may comprise a weatherproof gasket.

That is, the perimeter frame (2004) can be made from a rubber or other moisture-inhibiting material, and provides an interface between the vestibule (101) and door (103) which, when installed snugly (e.g., using the spacer washers as described elsewhere herein), further provides weatherproofing. In this configuration, the posts (2007) are contained within the weatherproofing seal provided by the perimeter frame (2004) and thus additional weatherproofing of the posts (2007) is not necessary. The perimeter frame (2004) may be installed using hardware, an adhesive, a friction fit, or through any other means known in the art.

In an embodiment, the pet vestibule may be supplemented or replaced by an indoor pet kennel or dog crate. Such enclosures are commonly used for training, security, and transportation. Indoor dog crates generally lack weatherproofing features and are intended to simulate the natural "den" environment that a dog prefers. Dog owners may prefer that their dogs be able to come indoors to escape from unusually hostile weather conditions, but not want the dog to have the freedom to roam the interior of the home unattended.

In such circumstances, a dog kennel may be attached to the interior surface of the door (103) by connecting the dog kennel to the portion of the posts (2007) protruding into the interior of the home. An exemplary, non-limiting embodiment is depicted in FIG. 14. The depicted dog kennel itself may be a typical dog kennel having a connecting means for fixedly receiving the posts (2007), such as a receiver (1507) with bores (1505) to accommodate the cotter pin or another attaching means known in the art. The side of the kennel (1503) adjacent the door (103) is a fully or partially open side to allow the animal to enter the kennel (1503) through the pet door opening in the door (103). The opposing side (1503) of the kennel may contain a conventional kennel door, allowing the owners to permit the animal further entry into the home from the kennel (1501).

Figure 15:
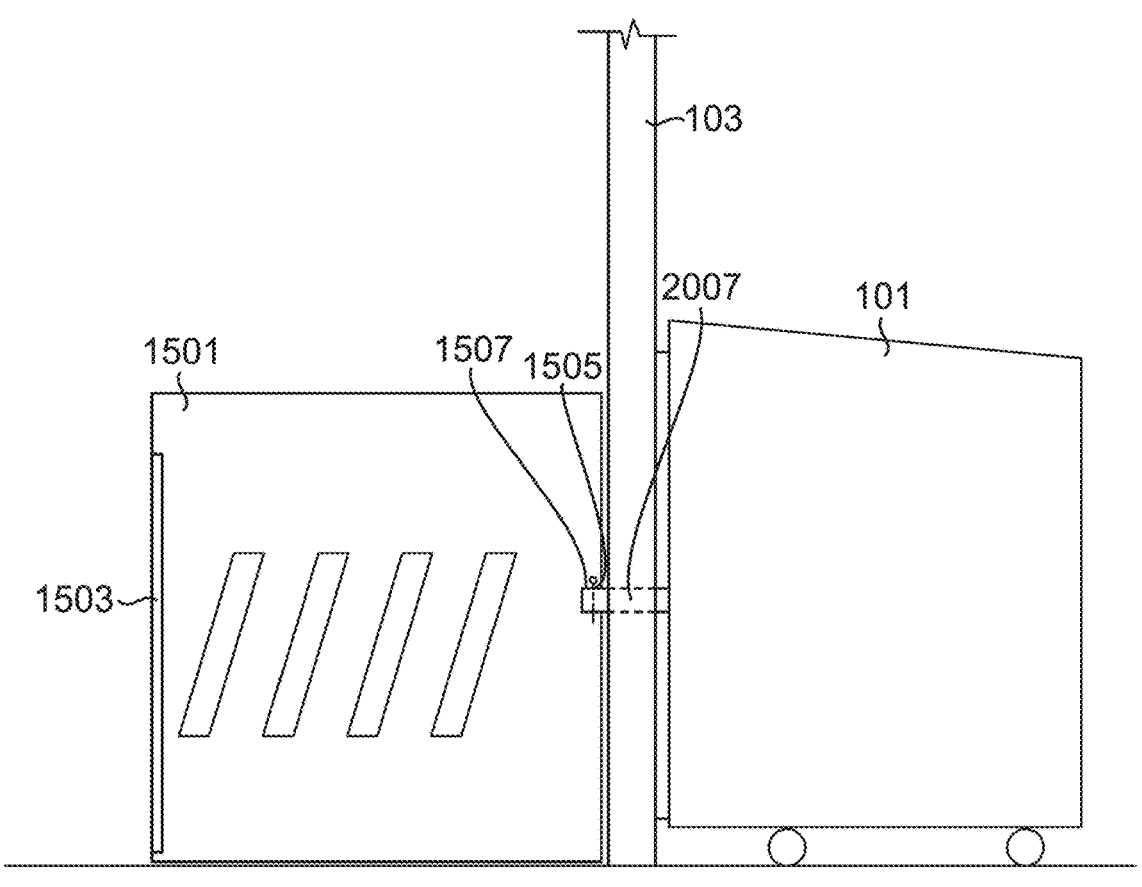
FIG. 15 depicts a side-elevation view of a vestibule and indoor pet kennel attached to opposing sides of a door.

By way of example and not limitation, the connecting means may comprise a cylindrical receiving channel (1505) into which the posts are inserted, and with a through bore (1507) corresponding to the location of the through bore in the post (2007). A cotter pin or other locking means can then be inserted into the aligned bores to hold the kennel (1501) and vestibule (101) in place on opposing sides of the door (103) via the posts. FIG. 15 depicts one such embodiment in which the post receiver (1505) in a "clamshell" style plastic kennel (1503) made from top and bottom clamshell elements joined together. This is by no means limiting and other means are known in the art and may be used for this type of attachment.

Figure 16:
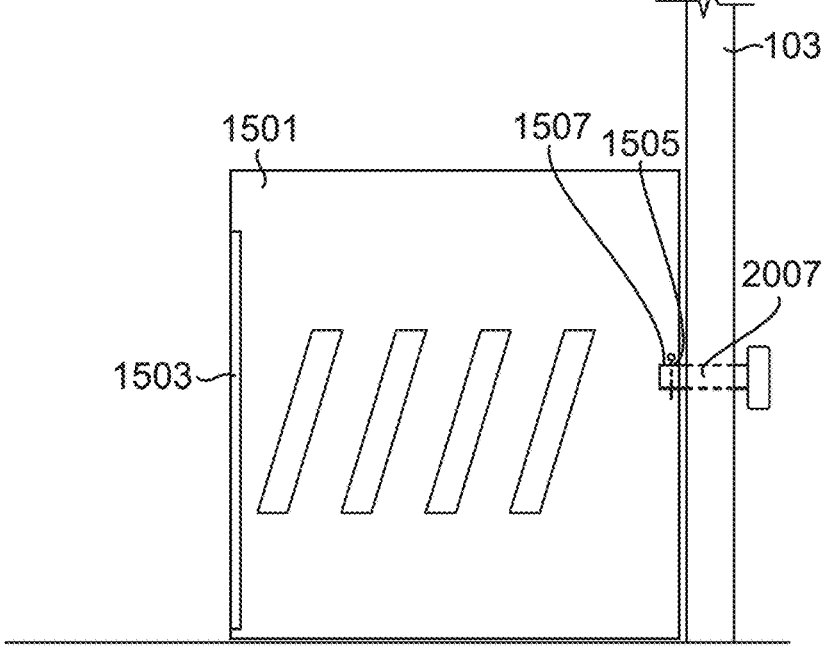
FIG. 16 depicts a side-elevation view of an indoor pet kennel attached to an interior side of a door without a vestibule.

Additionally, some consumers may prefer the interior kennel (1503) without the use of the vestibule (101). In such cases, a post with an external flange may be used, as shown in FIG. 16, in the same fashion as the post for the vestibule. Alternatively, the kennel (1501) may be constructed with posts (2007) and the sleeves are installed in reverse on the door. These configurations allow the animal to enter the home from outside, but being confined to the kennel (1501) until the kennel door (1503) is opened.

Throughout this disclosure, geometric terms may be used to characterize, among other things, sizes, shapes, dimensions, angles, distances, and relationships. Additionally, qualifiers such as "generally," "about," and "approximately" may be used. One of ordinary skill in the art will understand that, in the context of this disclosure, these terms are used to describe a recognizable attempt to conform a device or component to the qualified term. By way of example and not limitation, components described as being "generally coplanar" will be recognized by one of ordinary skill in the art to not be actually coplanar in a strict geometric sense because a "plane" is a purely geometric construct that does not actually exist and no component is truly "planer," nor are two components ever truly coplanar. Variations from geometric descriptions are unavoidable due to, among other things, manufacturing tolerances resulting in shape variations, defects, imperfections, non-uniform thermal expansion and contraction, natural wear, and other variations and deformations that are nevertheless recognizable as the qualified term. One of ordinary skill in the art will understand how to apply geometric terms, whether or not qualified by relative terms such as "generally," "about," and "approximately," to describe a reasonable range of variations from the modified term in view of these and other considerations appropriate to the context. Additionally, the use of the conjunctive and disjunctive should not necessarily be construed as limiting, and the conjunctive may include the disjunctive, and vice versa.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. A housing system comprising:
   a vestibule comprising:
      an open side comprising at least one attaching means;
      a first wall side;
      a second wall side;
      a third wall side having an opening therein;
      a top side attached to said open side, said first wall side, said second wall side, and said third wall side;
      a floor side opposing said top side and attached to said open side, said first wall side, said second wall side, and said third wall side;
      a movement means; and
      a locking means; and
   a kennel comprising:
      a first side having a door therein.

2. The system of claim 1, wherein said open side further comprises a perimeter frame having a weatherproof sealant.

3. The system of claim 1, further comprising a base frame element removably attached to said floor side.

4. The system of claim 3, further comprising at least one corner frame element removably attached to said base frame element.

5. The system of claim 4, wherein said open side, said first wall side, said second wall side, and said third wall side are installed between two of said frame elements.

6. The system of claim 5, wherein the walls are removable and interchangeable.

7. The system of claim 4, wherein said top side is removably attached to said open side, said first wall side, said second wall side, and said third wall side.

8. The system of claim 4, wherein, prior to being removably assembled to form said vestibule, said open side, said first wall side, said second wall side, said third wall side, said top side, said base frame element, said floor side, said movement means, and said corner frame element are flat-packed.

9. The system of claim 1, wherein said movement means are wheels.

10. The system of claim 1, wherein said locking means is a cotter pin.

11. The system of claim 1, wherein said top side is translucent.

12. The system of claim 1, wherein said top side is transparent.

13. The system of claim 1, further comprising at least one height-adjusted leg assembly.

14. The system of claim 1, wherein said first side having a door further comprises a latch.

15. A method comprising:
   providing a door having an opening therein:
   providing a vestibule comprising:
      an open side comprising at least one post extending from therefrom, and at least one post having a length greater than the thickness of said door and a bore disposed therethrough at a distal end;
      a first wall side;
      a second wall side;
      a third wall side having an opening therein;
      a top side attached to said open side, said first wall side, said second wall side, and said third wall side;
      a floor side attached to said open side, said first wall side, said second wall side, and said third wall side; and a movement means;

drilling at least one hole through said door, said hole having a diameter effective to receive said at least one post;

using said movement means, moving said vestibule to place said open side adjacent said opening; and passing said at least one post through said drilled hole.

16. The method of claim 15, further comprising:

in said providing said vestibule, said vestibule further comprising a weatherproof sealant; and after said moving:

said perimeter frame surrounding said opening; and said weatherproof sealant protecting said opening from moisture penetration.

17. The method of claim 15, wherein said open side, said first wall side, said second wall side, said third wall side, said top side, said floor side, and said movement means are removably assembled to form said vestibule.

18. The method of claim 17, wherein said open side, said first wall side, said second wall side, said third wall side, said top side, said floor side, and said movement means are, prior to being removably assembled to form said vestibule, flat-packed.

19. The method of claim 16, wherein said weatherproof sealant is a gasket.

20. The method of claim 16, wherein said weatherproof sealant is a door sweep.

\* \* \* \* \*